Patented Nov. 16, 1937

2,099,475

UNITED STATES PATENT OFFICE 2,099,475

PURIFICATION OF SYNTHETICALLY PRODUCED ALCOHOLS

Johann Giesen, Helmut Hanisch, and Martin Dally, Leuna, Germany, assignors to I. G. Farbenindustrie Aktiengesellschaft, Frankfort-on-the-Main, Germany No Drawing. Application September 13, 1935, Serial No. 40,412. In Germany October 10, 1934

5 Claims. (Cl. 260—156)

The present invention relates to the purification of alcohols obtained by the catalytic treatment of oxides of carbon with hydrogen or gases containing hydrogen under increased pressure.

In the catalytic reaction of oxides of carbon with hydrogen or gases containing hydrogen there may be obtained, by suitable choice of the reaction conditions, especially of the speed of flow, not only methanol but also products of higher boiling point containing mainly higher homologues of methanol. Different unitary alcohols may be recovered from the said mixtures, but their value is reduced by impurities having strong odor. Pure alcohols having the usual commercial properties cannot be obtained from the crude alcohols by a simple fractional distillation. The alcohols can be purified to a great extent by catalytic treatment with hydrogen under pressure, but even by this treatment it is sometimes not possible to remove the last traces of the impurities and to obtain entirely pure alcohols such as are necessary for example for pharmaceutical purposes.

It has also been proposed to effect a separation of alcohols from accompanying substances by the preparation of constant-boiling mixtures of alcohol and water. While, for example, normal propyl alcohol boils in an anhydrous state at 97° C., a mixture of about 72 parts of the alcohol with about 28 parts of water distils as a constant-boiling mixture at about 87° C. In such a working up of aqueous crude propyl alcohol, the compounds containing a carbonyl group and hydrocarbons present as impurities occur for the most part in the first parts of the distillate. After removing a certain amount of first runnings, fractions are then obtained which certainly have better properties than the crude propyl alcohol but the unsaturated compounds are only insufficiently removed. Furthermore, since a propyl alcohol containing large amounts of water is obtained, it is necessary to dehydrate the propyl alcohol again. Azeotropic distillation leads to similar results with the higher alcohols.

We have now found that the crude alcohols which have been separated by fractional distillation from the mixture of alcohols obtained by the catalytic reaction of oxides of carbon with hydrogen or gases containing hydrogen under high pressure can be purified in a very simple manner by subjecting the alcohols, if desired after catalytic treatment with hydrogen or gases containing hydrogen, to a distillation with an addition of an alcohol of lower boiling point.

If the initial alcohols according to this invention are those which have been subjected to a previous purification by catalytic treatment with hydrogen or gases containing hydrogen under normal or preferably increased pressure, entirely pure alcohols are obtained which may be directly employed even for cosmetic and pharmaceutical purposes. Even without the catalytic preliminary purification, there may be obtained from the crude alcohols formed by synthesis from oxides of carbon and hydrogen, by distillation with an alcohol of lower boiling point, products from which the impurities have been removed almost completely. Contrasted with azeotropic distillation, the process according to this invention has the advantage that subsequent dehydration of the alcohol is not necessary. The said catalytic pretreatment with hydrogen may take place in the liquid or in the gaseous phase. As catalysts suitable for this purpose may be mentioned those containing metals, as for example copper and metal oxides and sulphides such as the oxides and sulphides of the heavy metals of the 1st, 2nd, 4th, 5th, 6th or 8th groups of the periodic system.

The following examples will further illustrate how our invention may be carried out in practice, but the invention is not restricted to these examples.

Example 1

Crude propyl alcohol which has been separated by distillation from the product obtained by catalytic hydrogenation of carbon monoxide under a pressure of about 200 atmospheres is treated with hydrogen under increased pressure and at elevated temperature over a catalyst containing copper. In this manner the carbonyl value (112 being assumed to be the mean molecular weight for aldehyde or ketone) is reduced from 3.30 to 0.22 and the bromine value from 108 to 4. (The carbonyl value is determined by reacting the alcohol with hydroxylamine hydrochloride solution and titration of the hydrochloric acid set free; the bromine value represents how many cubic centimeters of an about 0.15 normal solution of bromine are required for 100 cubic centimeters of alcohol.)

If the crude propyl alcohol thus preliminarily purified be distilled in an efficient fractionation column, the distillate is certainly useful for many purposes, especially as a solvent, but not for pharmaceutical or cosmetic purposes by reason of the musty odor adhering thereto. Entirely pure propyl alcohol cannot be obtained in this manner.

If, on the other hand the crude propyl alcohol purified by hydrogenation be subjected with an addition of an equal volume of methanol to a fractional distillation, the alcohol thus treated has a number of advantages as compared with that only purified by hydrogenation. A yield of from 90 to 95 percent of a product having a mild alcoholic odor and no accompanying musty odor is obtained. Carbonyl compounds can no longer be detected. The bromine value is less than 1. When concentrated sulphuric acid is added, the purified alcohol remains water-clear (sulphuric acid test).

Example 2

Crude propyl alcohol (separated by distillation from the mixture of alcohols obtained by catalytic hydrogenation of carbon monoxide under increased pressure) having a strong musty odor, which is colored brown by concentrated sulphuric acid and which has a carbonyl value of 3.3 is separated into two equal portions. The first portion, without catalytic hydrogenation, is subjected to fractional distillation without the addition of methanol. The second portion, without catalytic hydrogenation, is subjected to fractional distillation with an addition of six times its volume of pure methanol. The difference between the two kinds of distillation is evident from the following tables:—

1.—Distillation of the crude propyl alcohol without the addition of methanol

| Fraction | Sulphuric acid test | Carbonyl value |
|---|---|---|
| Up to 86.5° C | Brown | 4.3 |
| Up to 94.0° C | Yellow-red | 1.7 |
| Up to 96.0° C | do | 1.3 |
| Up to 96.2° C | do | 1.1 |

2.—Distillation of the same crude propyl alcohol with an addition of six times the volume of pure methanol

| Fraction | Sulphuric acid test | Carbonyl value |
|---|---|---|
| Up to 86.5° C | Brown | 1.45 |
| Up to 94.0° C | Yellow | 0.34 |
| Up to 96.0° C | do | 0.22 |
| Up to 96.2° C | do | 0.22 |

As the tables show, the greater part of the impurities is removed by the distillation with an addition of methanol, as is indicated for example by the improvement in the sulphuric acid test. The sharp odor of the crude alcohol is rendered much more mild. The propyl alcohol thus purified is eminently suitable for many industrial purposes.

Example 3

A crude isobutyl alcohol (separated from the mixture of alcohols obtained by the catalytic hydrogenation of carbon monoxide under increased pressure) had the following characteristics: bromine value: 2.4, sulphuric acid test: red-yellow, stability to permanganate (i. e. the time during which the coloration of 5 cubic centimeters of the alcohol remains unchanged after the addition of 1 cubic centimeter of 0.1 per cent potassium permanganate solution): 40 seconds.

This crude isobutyl alcohol is separated into two portions, one being distilled without an addition of methanol and the other distilled with 4 times its weight of pure methanol. The difference may be seen from the following tables:

1.—Distillation without an addition of methanol

| Fraction | Percentage of crude isobutyl alcohol | Bromine value | Sulphuric acid test | Odor | Stability to permanganate |
|---|---|---|---|---|---|
| Up to 105° C | 9.8 | 2.2 | Yellow-red | Musty | 15 seconds |
| Up to 106° C | 8.0 | 1.8 | do | do | do |
| Up to 107° C | 18.6 | 1.4 | Pale yellow | Somewhat musty | 30 seconds |
| Up to 107° C | 20.0 | 2.0 | do | do | 1 minute 45 seconds |
| Up to 107° C | 19.7 | 2.0 | do | Almost good | 3 minutes 15 seconds |
| Up to 107.5° C | 19.7 | 3.4 | do | Somewhat musty | 3 minutes 30 seconds |
| Up to 108° C | 3.9 | 6.2 | Yellow | do | do |

2.—Distillation with 4 times the weight of pure methanol

| Fraction | Percentage of crude isobutyl alcohol | Bromine value | Sulphuric acid test | Odor | Stability to permanganate |
|---|---|---|---|---|---|
| Up to 106° C | 6.3 | 2.0 | Pale yellow | Musty | 3 minutes |
| Up to 107° C | 7.7 | 1.5 | do | Slightly musty | do |
| Up to 107.2° C | 10.2 | 1.0 | do | Almost good | do |
| Up to 108° C | 20.6 | 0.9 | Paler yellow | Good | 10.1 minutes |
| Over 108° C | 55.0 | 0.9 | do | Good | 17.3 minutes |

Thus while with the distillation without methanol only a slight improvement in the properties of the crude isobutyl alcohol can be seen, by the distillation with the addition of methanol, an isobutyl alcohol having greatly improved properties is obtained in a yield of about 75 per cent.

Example 4

A crude isobutyl alcohol (separated by distillation from the mixture of alcohols obtained by the catalytic hydrogenation of carbon monoxide under increased pressure) is separated into two portions one of which is split up into fractions in an efficient fractionation column without an addition of ethanol, the other being distilled in the same column with an addition of four times its weight of ethanol.

1.—*Distillation without addition of ethanol*

| Fraction | Percentage | Sulphuric acid test | Stability to permanganate | Odor | Bromine value |
|---|---|---|---|---|---|
| 98° to 105° C | 17.7 | Dark yellow | Immediate change | Slight taint | 68.9 |
| to 106° C | 18.9 | Yellow | do | do | 13.6 |
| to 106.5° C | 19.7 | do | do | do | 4.4 |
| to 106.5° C | 20.4 | do | do | do | 3.9 |
| to 107° C | 15.0 | do | 6 seconds | do | 5.9 |

2.—*Distillation with 4 times its weight of ethanol*

| Fraction | Percentage | Sulphuric acid test | Stability to permanganate | Odor | Bromine value |
|---|---|---|---|---|---|
| 92° to 106° C | 22.2 | Pale yellow | 5 seconds | Good | 26.4 |
| to 107° C | 25.4 | Paler yellow | 15 do | do | 3.2 |
| to 107° C | 24.9 | do | 25 do | do | 1.8 |
| to 107° C | 14.0 | do | 2 minutes 2 seconds | do | 1.2 |

Thus the distillation with ethanol considerably improves the crude isobutyl alcohol in the same way as does the distillation with methanol. A great part of the crude isobutyl alcohol treated with ethanol corresponds in its odor and also in other properties to a pure alcohol. Especially noticeable is the great improvement in the sulphuric acid test and the very far-reaching removal of readily oxidizable impurities.

What we claim is:—

1. In the purification of crude anhydrous alcohols separated from the mixture of alcohols obtained by the catalytic hydrogenation of oxides of carbon the step which comprises adding to the crude alcohol an alcohol of lower boiling point and subjecting this mixture to fractional distillation.

2. In the purification of crude anhydrous alcohols separated from the mixture of alcohols obtained by the catalytic hydrogenation of oxides of carbon the step which comprises subjecting the crude alcohol to a catalytic purification with hydrogen, then adding to the alcohol an alcohol of lower boiling point and subjecting this mixture to fractional distillation.

3. In the purification of the mixture of crude alcohols obtained by the catalytic hydrogenation of oxides of carbon the method which comprises subjecting the mixture to distillation to obtain individual alcohols in separate fractions and removing the last traces of impurities from the substantially anhydrous individual alcohols by adding an alcohol of lower boiling point thereto and subjecting this mixture to fractional distillation.

4. In the purification of the mixture of crude alcohols obtained by the catalytic hydrogenation of oxides of carbon the method which comprises subjecting the mixture to distillation to obtain individual alcohols in separate fractions and removing the last traces of impurities from the substantially anhydrous individual alcohols by adding at least an equal volume of an alcohol of lower boiling point thereto and subjecting this mixture to fractional distillation.

5. In the purification of the mixture of crude alcohols obtained by the catalytic hydrogenation of oxides of carbon the method which comprises subjecting the mixture to distillation to obtain individual alcohols in separate fractions, subjecting the crude alcohols to a catalytic purification with hydrogen and removing the last traces of impurities from the substantially anhydrous individual alcohols by adding at least an equal volume of an alcohol of lower boiling point thereto and subjecting this mixture to fractional distillation.

JOHANN GIESEN.
HELMUT HANISCH.
MARTIN DALLY.